(12) United States Patent
Thörn

(10) Patent No.: US 7,990,421 B2
(45) Date of Patent: Aug. 2, 2011

(54) ARRANGEMENT AND METHOD RELATING TO AN IMAGE RECORDING DEVICE

(75) Inventor: Ola Karl Thörn, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 385 days.

(21) Appl. No.: 12/175,971

(22) Filed: Jul. 18, 2008

(65) Prior Publication Data

US 2010/0013943 A1    Jan. 21, 2010

(51) Int. Cl.
*H04N 5/232* (2006.01)
(52) U.S. Cl. .............. 348/211.99; 348/222.1; 715/863
(58) Field of Classification Search .................. None
See application file for complete search history.

(56) References Cited

U.S. PATENT DOCUMENTS

| | | | | |
|---|---|---|---|---|
| 2004/0196400 A1* | 10/2004 | Stavely et al. | ........... | 348/333.01 |
| 2005/0094019 A1* | 5/2005 | Grosvenor et al. | ........... | 348/335 |
| 2005/0105759 A1* | 5/2005 | Roberts et al. | ................ | 382/100 |
| 2005/0271279 A1* | 12/2005 | Fujimura et al. | .............. | 382/203 |
| 2006/0176392 A1* | 8/2006 | Rainier et al. | ................ | 348/376 |
| 2007/0252898 A1* | 11/2007 | Delean | ...................... | 348/211.99 |
| 2007/0274703 A1* | 11/2007 | Matsuda | ........................ | 396/264 |
| 2007/0283296 A1* | 12/2007 | Nilsson | .......................... | 715/863 |
| 2008/0049110 A1 | 2/2008 | Arbouzov | | |
| 2008/0089587 A1* | 4/2008 | Kim et al. | ..................... | 382/190 |
| 2008/0089597 A1 | 4/2008 | Guo et al. | | |
| 2008/0212831 A1* | 9/2008 | Hope | ........................... | 382/103 |
| 2009/0059021 A1* | 3/2009 | Rimon et al. | .............. | 348/222.1 |

FOREIGN PATENT DOCUMENTS

| | | | |
|---|---|---|---|
| GB | 2 407 635 | | 5/2005 |
| JP | 2005051472 A | * | 2/2005 |
| WO | WO-0172034 A1 | * | 9/2001 |

OTHER PUBLICATIONS

Patent Cooperation Treaty International Search Report and Written Opinion of the International Searching Authority corresponding to PCT/EP2009/050513 dated May 8, 2009, 11 pages.

* cited by examiner

*Primary Examiner* — Lin Ye
*Assistant Examiner* — Dennis Hogue
(74) *Attorney, Agent, or Firm* — Harrity & Harrity, LLP

(57) ABSTRACT

An input system for a digital camera may include a portion for taking at least one image to be used as a control image; and a controller to control at least one operation of the digital camera based on a control command recognized from the control image, the control command controlling a function of the camera.

13 Claims, 4 Drawing Sheets

ARRANGEMENT AND METHOD RELATING TO AN IMAGE RECORDING DEVICE

TECHNICAL FIELD

The present invention generally relates to a method and arrangement in digital image recording device and, more particularly, remote control of such a device.

BACKGROUND OF THE INVENTION

Portable electronic devices, such as mobile phones, have been popular for years and yet only continue to increase in popularity. Traditionally, mobile phones had been used strictly for conventional voice communications. However, as technology has developed mobile, phones are now capable not only of conventional voice communications, but also are capable of data communications, video transfer, media reproduction, commercial radio reception, etc. More and more, a user having a single electronic device such as a mobile phone is able to perform a variety of different functions.

Many mobile phones today include a camera function for taking pictures. The pictures may be stored digitally in memory, transmitted over the carrier network, etc. As technology and manufacturing processes have improved, mobile phones presently are capable of capturing images at relatively high resolutions previously found only in dedicated cameras. This has resulted in mobile phones possessing even more sophisticated camera features. These features include, for example, macro operation, auto focus control, red-eye reduction, etc.

Taking pictures using a self-timer is problematic since it is hard to frame the picture in a smart way, because the user (the object to be photographed) is not able to see the recorded image area.

SUMMARY OF THE INVENTION

Embodiments of the present invention provide a functionality in a digital image recording device, for example, a camera incorporated in a wireless communication terminal, or the like, which allows determining an image recording time and/or area using remote control using, for example, a body part.

Embodiments of the invention provide a method for input into a digital camera. The method may include: using at least one image or part of the image as a control image, comparing the control image to a corresponding control command, selecting a control command according to a comparison result, the control command controlling the camera remotely, and executing the control command. For example, the control command may be at least one of a self timer setting command, cropping, or zooming. The control command may be generated by one or more body parts or an indicator. For example, the control command may include a hand gesture. The control command may also include commands for controlling at least one of a flash, a focus, colour settings, or a camera mode. The command may also be used to mark up an object.

According to one embodiment, the control command may generate a boundary for limiting image. The boundary may be a virtual frame generated by portions of a command generating part.

For example, the body part may belong to one or more persons.

The invention also relates to an input system for a digital camera. The system may include: a portion for taking at least one image to be used as a control image; a controller configured to control at least one operation of the digital camera in accordance with a control command recognized from the control image, the control command controlling a function of the camera. The function may be at least one of a self timer setting command, cropping, or zooming.

According to one embodiment, the controller may include: a control image mapper for mapping a first image to a control command; an image comparator for selecting a target control command by comparing the input image with the control image; and a control image adapter for executing the control commands mapped to the target control image The command may set a virtual frame for zooming on an area sat by the frame.

The input system may be incorporated in a gaming device, web camera, laptop computers, a PDA (Personal Digital Assistant), a surveillance camera, a GPS (Global Positioning System) device, a video camera, and/or a mobile communication terminal.

The invention also relates to a mobile communication terminal including a memory, a key input unit, a display unit, a transceiver, a camera, and a controller for controlling at least one operation of the camera in accordance with a control command selected by comparing an input image and a control command, the control command controlling the terminal remotely. The command may be at least one of a self-timer setting command, cropping, or zooming.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION OF PREFERRED EMBODIMENTS

Exemplary embodiments of the present invention are described with reference to the accompanying drawings in detail. The same reference numbers are used throughout the drawings and may refer to the same or like parts. For the purposes of clarity and simplicity, detailed descriptions of well-known functions and structures incorporated herein may be omitted to avoid obscuring the subject matter of the present invention. Further, the drawings and description are to be regarded as illustrative in nature and not restrictive.

According to the teachings of the present invention, the gesture images, e.g., by using hand gesture recognition that is focused on the framing hand gesture, e.g., using the thumb and the other fingers holding together and the hands positioned opposite each other, the arrangement of the invention can, for example, exactly know where to crop or zoom and/or start a self timer to start recording an image. When a gesture is identified, the camera zoom or crops and start the self timer, it could further automatically retouch the picture so that possible "body parts" are removed (at same time or a later stage).

In the following exemplary embodiments, the hands of a human are given as an example and it should be appreciated that other body parts or specific maker devices may achieve the same purposes.

In an embodiment, for example, hands positioned opposite each other could belong to different persons, so the camera can efficiently frame a group picture.

In the following, the gesture recognition input system and method of the present invention is described in association with an operation of a mobile phone. However, the gesture recognition input system and method can be used with other devices that have a camera for taking an images and memory for storing representative images matching corresponding instructions. For example, the hand gesture recognition input system and methods can be implemented with information processing devices such as a cellular phone, Digital Multimedia Broadcasting (DMB) receiver, Personal Digital Assistant (PDA), Smartphone, International Mobile Telecommunication 2000 (IMT-2000) terminal, Wideband Code Division Multiple Access (WCDMA) terminal, and Universal Mobile Telecommunication Service (UMTS) terminal.

Figure 1:
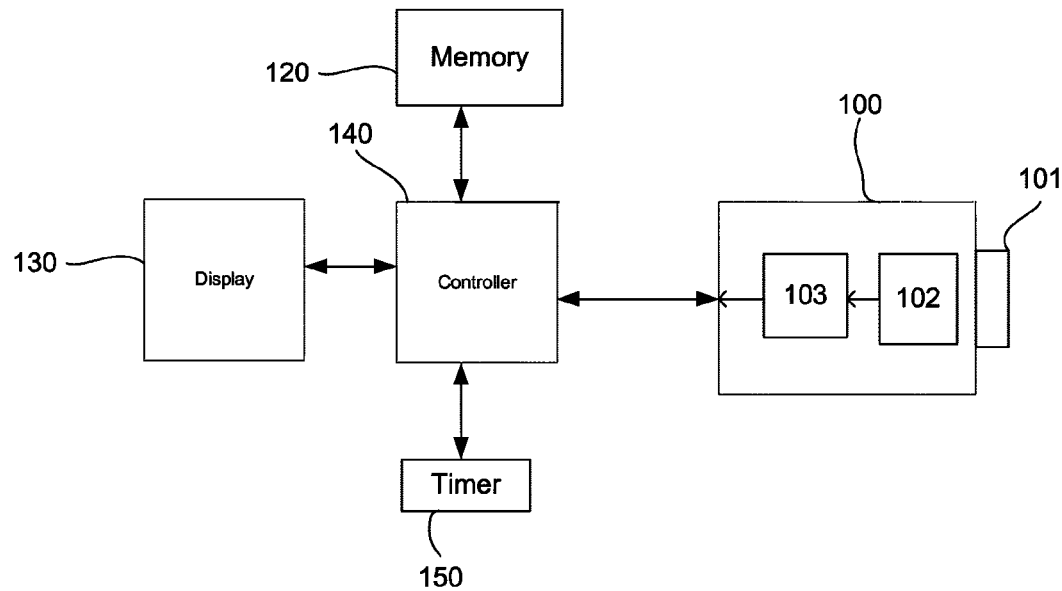
FIG. 1 illustrates a block diagram of a portion of a digital camera according to the present invention.

FIG. 1 is a block diagram illustrating a hand gesture recognition input system for a digital camera, for example incorporated in a mobile phone according to one embodiment of the present invention. The hand gesture recognition input system may include a camera 100, a memory unit 120, a display 130, a controller 140, and a timer 150. The timer function may be incorporated in controller 140.

In operation, camera 100 may capture an image, for example, using a lens 101 and a photo-sensitive sensor 102, and convert the image into a digital signal using an encoder 103. In this embodiment, hand gestures captured by the camera may be stored as control images. For obtaining various hand gesture control images, camera 100 can capture motion images as well as still images and temporarily store the images in a buffer memory. The control images may be mapped to specific position control commands so as to be used for a frame manipulation, according to the invention.

Memory unit 120 may store a plurality of application programs for operating functions of the mobile phone including camera operation applications, and the control images. Memory unit 120 includes a program memory region and a data memory region.

The program memory region stores an operating system (OS) for managing hardware and software resources of the mobile phone, and application programs for operating various functions associated with multimedia contents such as sounds, still images, and motion pictures, and camera operation applications. The mobile phone activates the applications in response to a user request under the control of controller 140.

The data memory region may store data generated while operating the applications, particularly the control images in corporation with the camera operation application. A portion of the data memory region can be used as the buffer memory for temporarily storing the images taken by camera 100.

Display 130 may have a screen, for example, for displaying various menus for the application programs and information input or requested by a user. Display 130 may also display still or motion images taken while viewing an image projected on a camera lens. Display 130 can be a liquid crystal display (LCD) or any other type of display. In a case when the LCD is implemented with a touch-screen, display 130 can be used as an additional input means. Display 130 can display menu windows associated with the application programs so as to allow the user to select options for operating the application programs.

Figure 2:
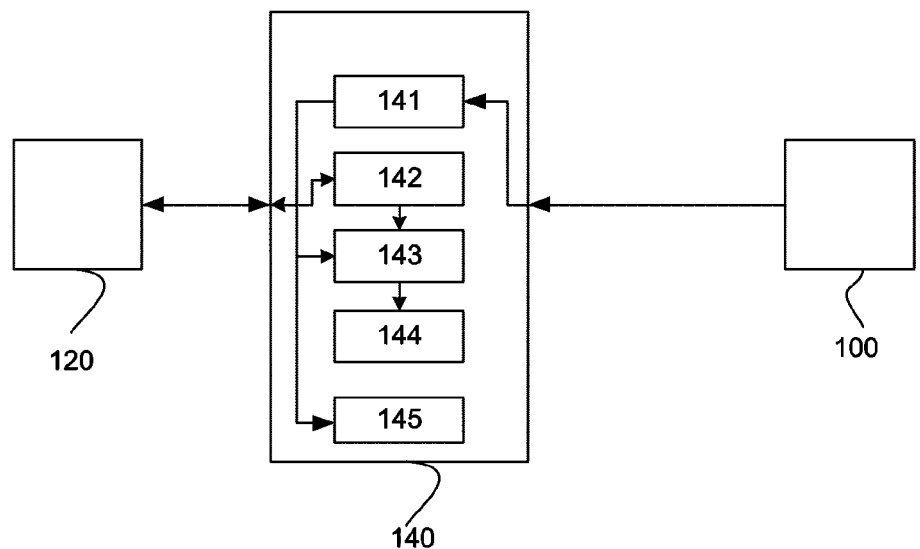
FIG. 2 illustrates a configuration of the digital camera according to the present invention.

FIG. 2 is a block diagram illustrating the configuration of the recognition according to the present invention.

The image data received from camera 100 may either be stored in memory unit 120 or an intermediate memory or directly be processed by controller 140.

Controller 140 may include, as applications in software or hardware, a control sign generator 141 for controlling camera 100 to capture the images, an image mapper 142 for mapping the images to a corresponding control commands, a control image comparator 143 for comparing input images taken by camera 100 to the control commands, and a control image adapter 144 for executing the focus, crop, timer, or other functions. A self timer 150 may be provided with a time period to start countdown and outputs a signal to the controller (or directly to camera 100) to record an image.

In operation, controller 140 may execute gesture recognition operation on a temporary image captured by camera 100 and store it as a control image into memory unit 120 (or another intermediate memory). Control sign generator 141 may control the temporary image for hand gestures of the user, and select and store the control image, for example, in memory 120.

Image mapper 142 may link the collected control image to the control commands for controlling the zooming, focusing, cropping, and/or timer functions; this may also be carried out in association with menu options of camera 100.

The control commands mapped to the control image include one or several activation commands. The control commands may, for example, instruct camera controller 140 to zoom to a specific area, for example, constituted by the hands of the user.

Figure 3:
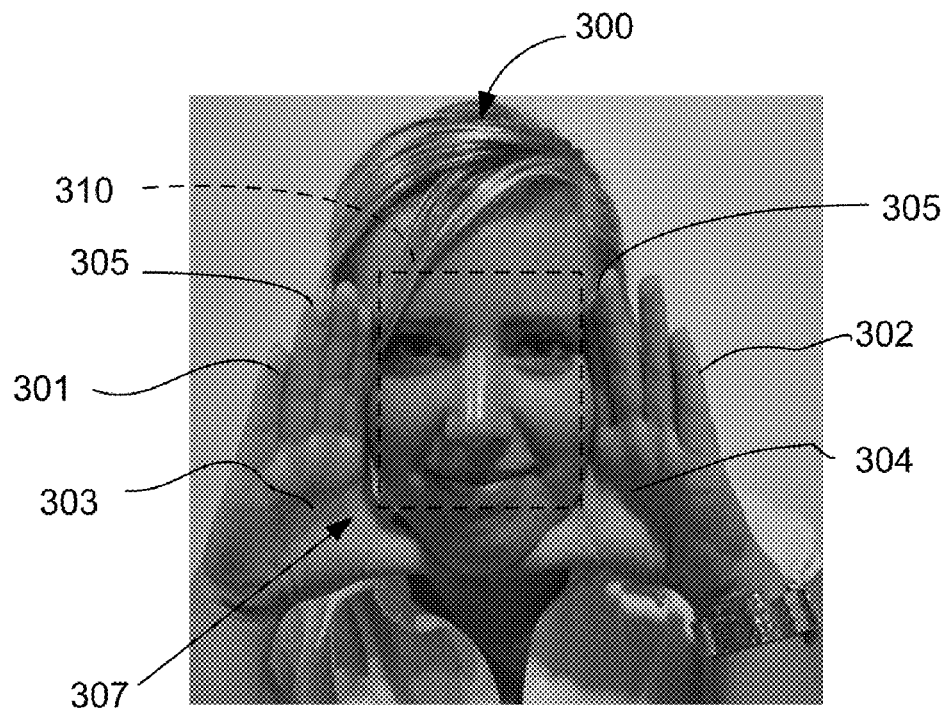
FIG. 3 illustrates a person to be photographed by the camera according to FIG. 1.
Figure 4:
FIG. 4 illustrates a resulting image.

FIGS. 3 and 4 illustrate an exemplary case. An object 300 uses her hands 301, 302 to either control a self timer of the camera or generate a virtual frame 310 or both functions. When the image is received by the controller, it scans the image (data) and looks for, for example hand palm(s) 303, 304 and/or fingertips 305 or any other predefined shapes or parts relatable to a statistical or stationary gesture. For example, the focus activation command can be represented by a hand gesture image according to FIG. 3 in which joints 307 of thumbs and index fingers constitute the lower part of the frame and fingertips the upper part of the frame and the sides may be generated using upper and lower sides' endpoints. The timer function may be activated using only a predetermined time by detecting the specific position of the hands or it may be set to a time period, for example by counting the number of fingers or fingertips.

FIG. 4 illustrates the resulting image, in which the controller has produced a zoomed picture based on virtual frame 310.

As described earlier, control image mapper 142 may establish mappings between the hand gestures/shape and the control commands. Also, other control commands can be represented with, for example, a hand gesture transition from an initial hand gesture. Image comparator 143 may compare the gesture in the temporary currently captured image with the control commands for example stored in the memory and determines whether the currently captured image is valid as a control image. That is, control image comparator 143 may monitor the image input through camera 100 and detect similarities of the currently captured images to the control commands. Moreover, if an image of which the similarity is in a tolerable range for any control command is detected, control image comparator 143 may report the valid command to control image adapter 144. The tolerable range may be set for checking an offset between an input image and control images regardless of a position of the hand. The offset between the two images may be determined in association with a size of the hand and angles of the fingers, and expressed in an offset percentage. If the offset lies within the tolerable percentage range, control image comparator 143 may determine an input of the control command. Control image comparator 143 may compare incoming images to the control commands using a wide tolerable range through a rough comparison process and then compare the currently captured image to the control images selected at the rough comparison process through a fine comparison process.

Control image adapter 144 may control the execution of the control command mapped to the control image determined by control image comparator 143.

As described above, the hand gesture recognition input system of the present invention may determine an input of a control image captured by a camera and execute a control command, such as setting the self timer and/or zooming, mapped to the control image.

When it is established that a control command is in the image and the nature of the control command is determined, a second picture may be taken based on the instructions related to the control command, for example, starting the self timer and/or zooming to a target area, without the user having to maneuver the camera using menus at the display or control bottoms, etc.

The controller may further comprise an image enhancer 145. The cropping and zooming operations can be executed after that the entire image is acquired. Image enhancer 145 may obtain the image from memory 120 and, based on the information from the mapper, find the virtual frame and crop the image to the frame.

Figure 5:
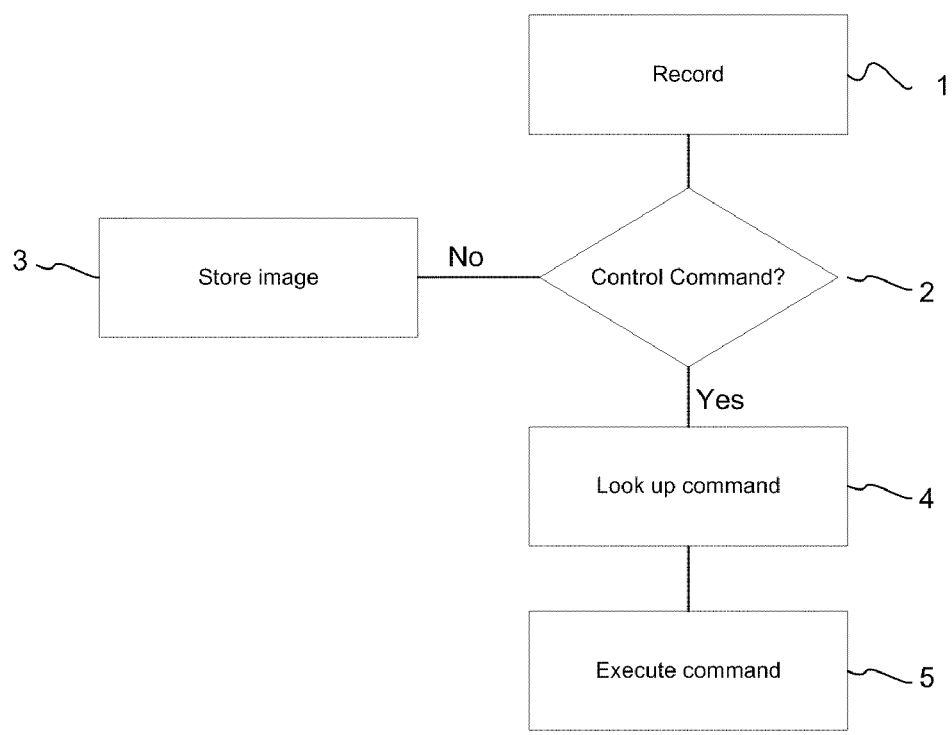
FIG. 5 illustrates a flow diagram according to the method of the present invention.

Thus, a generalized method of the invention illustrated in FIG. 5 includes the operations of:
(1) acquiring an image
(2) looking up the image or part of it for a control command and comparing the control image to a corresponding control commands in the memory,
(3) if there are no control commands detected, the image is stored as an ordinary image,
(4) If a control command is detected as a comparison result, the type of it is recognized, and
(5) the control command is executing.

Figure 6:
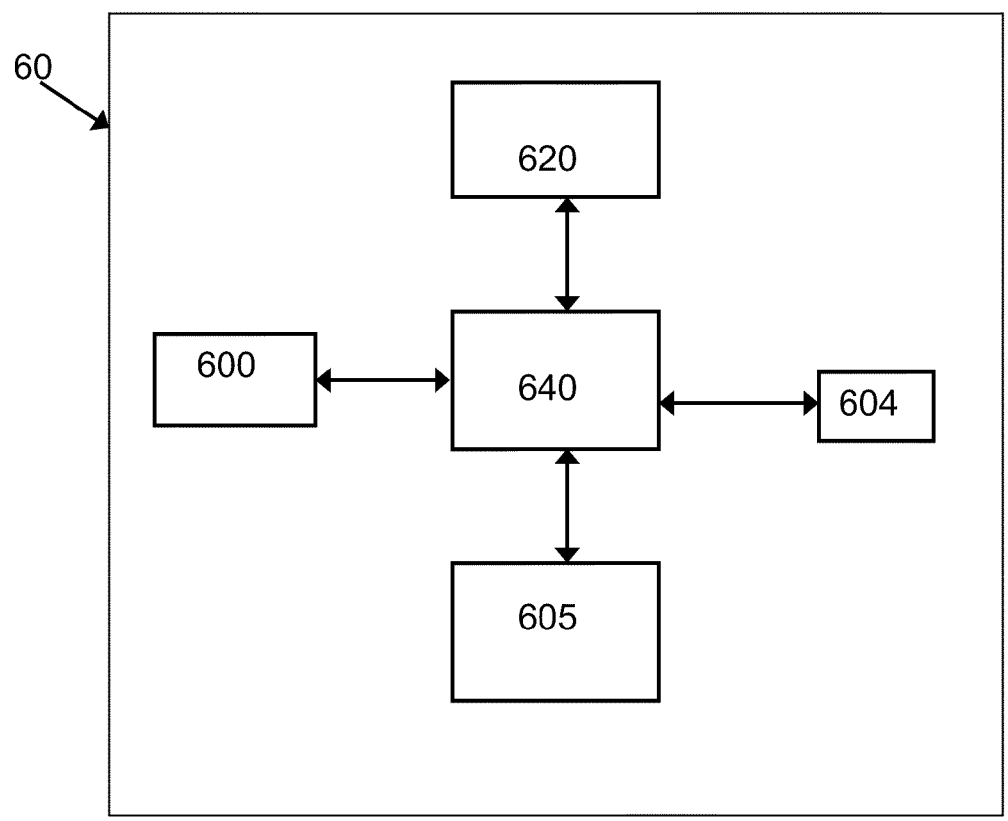
FIG. 6 illustrates a block diagram of a mobile communication device according to the present invention.

FIG. 6 is a block diagram illustrating a structure of a mobile communication terminal 60 in accordance with an embodiment of the present invention. Referring to FIG. 6, the mobile communication terminal 60 may includes a memory 620, a key input unit 605, a display unit 630, a transceiver 604, a camera 600, and a controller 640. Controller 640 may process voice signals and/or data according to the protocol for a phone call, data communication, or wireless Internet access and controls the respective components of the mobile communication terminal, and operates as described earlier. Naturally, additional controllers may be implemented to carry out the functions as described. Furthermore, controller 640 may receive key input from key input unit 605, and control display unit 630 to generate and provide image information in response to the key input, for example, setting the terminal in camera mode. The commands may also control other functions of the terminal such as calling a certain number, Internet surfing, etc.

As mentioned earlier, the user does not need to use hands. In a group picture, for example, two persons may use their arms to generate the virtual frame around the group of people/objects to be photographed.

Other fields of application for the invention may include: gaming device, webcam, laptop computers, surveillance camera, GPS, and video cameras.

Moreover, a user can have a camera mounted on a carrier, for example, on the shoulder, in a headset, heads up display or in glasses. In such a wearable the method can be used to likewise zoom, take pictures, or be used to mark/indicate an object that the user wants want to manipulate, for example, marking an object that should be tagged (e.g., with voice) or make a query about "marked up a sign" and ask for information. In this case the communication device may send a query to a database service with the marked up object, and obtain a response.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part using both hardware and software, and that several "means", "units" or "devices" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

What is claimed is:

1. In a camera, a method of inputting, the method comprising:
using at least one image or part of the image as a control image;
comparing the control image to a corresponding control command;
selecting a control command based on a result the comparison, the control command controlling the camera remotely; and
executing the control command to generate a boundary for limiting a captured image, wherein the boundary is a virtual frame generated by portions of a command generating part, and
wherein at least one of the using, comparing, selecting, or executing occur during a self timer mode of operation.

2. The method of claim 1, wherein the control command is at least one of cropping, or zooming.

3. The method of claim 1, wherein the control command is generated by one or more body parts or an indicator.

4. The method of claim 3, wherein the body part belongs to one or several persons.

5. The method of claim 1, wherein the control command comprises a hand gesture.

6. The method of claim 1, wherein the control command further comprises commands for controlling at least one of a flash, a focus, colour settings, or a camera mode.

7. An input system for a camera, comprising:
a portion for taking at least one image to be used as a control image; and
a controller configured to control at least one operation of the camera based on a control command recognized from the control image, the control command controlling a function of the camera during a self timer mode of operation,
where the control command generates a boundary for limiting a captured image, and
where the boundary is a virtual frame generated by portions of a command generating part.

8. The system of claim 7, wherein the function is at least one of cropping, or zooming.

9. The system of claim 7, wherein the controller comprises:
a control image mapper to map a first image to a control command;
an image comparator to select a target control command by comparing the input image with the control image; and
a control image adapter to execute the control commands mapped to the target control image.

10. The system of claim 7, wherein the control command sets the virtual frame for zooming on an area defined by the frame.

11. The system of claim 7, incorporated in a gaming device, a web camera, a laptop computers, a PDA (Personal Digital Assistant), a surveillance camera, a GPS (Global Positioning System) device, a video camera, or a mobile communication terminal.

12. A mobile communication terminal comprising:
a memory;
a key input unit;
a display unit;
a transceiver;
a camera; and
a controller to control at least one operation of the camera based on a control command selected by comparing an input image and the control command, the control command controlling the terminal remotely during a self timer mode of operation,
where the control command generates a boundary for limiting a captured image, and
where the boundary is a virtual frame generated by portions of a command generating part.

13. The mobile communication terminal of claim 12, wherein the command is at least one of cropping, or zooming.

* * * * *